(12) United States Patent
Yutani

(10) Patent No.: US 8,160,450 B2
(45) Date of Patent: Apr. 17, 2012

(54) TRANSCEIVER FOR OPTICAL TRANSMISSION AND TRANSMISSION METHOD FOR THE SAME

(75) Inventor: Katsuhiro Yutani, Tokyo (JP)

(73) Assignee: NEC Corporation, Tokyo (JP)

( * ) Notice: Subject to any disclaimer, the term of this patent is extended or adjusted under 35 U.S.C. 154(b) by 778 days.

(21) Appl. No.: 12/051,544

(22) Filed: Mar. 19, 2008

(65) Prior Publication Data
US 2008/0232813 A1 Sep. 25, 2008

(30) Foreign Application Priority Data

Mar. 22, 2007 (JP) ................. 2007-075372

(51) Int. Cl.
*H04B 10/00* (2006.01)
*H04B 10/04* (2006.01)
(52) U.S. Cl. ......... 398/135; 398/136; 398/140; 398/198
(58) Field of Classification Search .............. 398/115, 398/135, 137, 139, 140, 182, 198, 32
See application file for complete search history.

(56) References Cited

U.S. PATENT DOCUMENTS

| 4,908,600 | A | * | 3/1990 | Martinez ................. 340/538.11 |
|---|---|---|---|---|
| 5,093,744 | A | | 3/1992 | Sato et al. |
| 5,373,385 | A | | 12/1994 | Darcie et al. |
| 5,424,932 | A | * | 6/1995 | Inou et al. ................. 363/21.06 |
| 5,602,665 | A | * | 2/1997 | Asako ........................... 398/137 |
| 6,590,686 | B1 | * | 7/2003 | Sekiya et al. ................. 398/183 |
| 7,146,110 | B2 | * | 12/2006 | Frederiksen et al. ......... 398/194 |
| 7,190,904 | B2 | * | 3/2007 | DeCusatis et al. ............. 398/95 |
| 7,194,012 | B2 | * | 3/2007 | Mason et al. ............... 372/38.02 |
| 2003/0012244 | A1 | * | 1/2003 | Krasulick et al. ............... 372/50 |
| 2003/0103772 | A1 | * | 6/2003 | Ishii et al. ..................... 398/197 |
| 2007/0127534 | A1 | * | 6/2007 | Shimamura et al. ......... 372/50.1 |
| 2007/0183790 | A1 | * | 8/2007 | Matsumoto ................... 398/182 |

FOREIGN PATENT DOCUMENTS

| GB | 2316562 | A | 2/1998 |
|---|---|---|---|
| JP | 04188686 | A | 7/1992 |
| JP | 08191271 | A | 7/1996 |
| JP | 10065627 | A | 3/1998 |
| JP | 2005080394 | A | 3/2005 |

OTHER PUBLICATIONS

European Search Report for EP Application No. 08102481.2 completed Jun. 11, 2008.

* cited by examiner

*Primary Examiner* — Kenneth N Vanderpuye
*Assistant Examiner* — Abbas H Alagheband

(57) ABSTRACT

The present invention provides a transceiver for optical transmission in which noise can be sufficiently suppressed and a method for the same using a simple configuration. The transceiver includes an optical transmitter module in which a low frequency obtained by boosting and filtering a power-source voltage is superimposed onto and LD drive current.

8 Claims, 4 Drawing Sheets

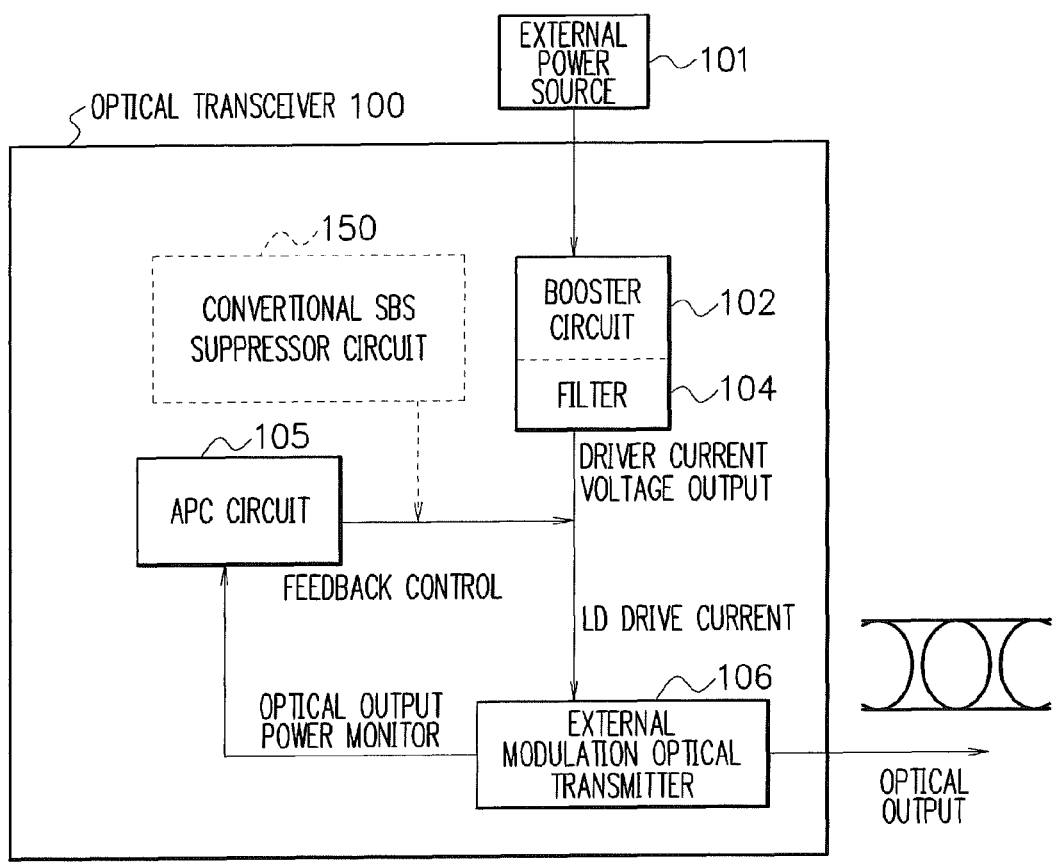
F I G. 1

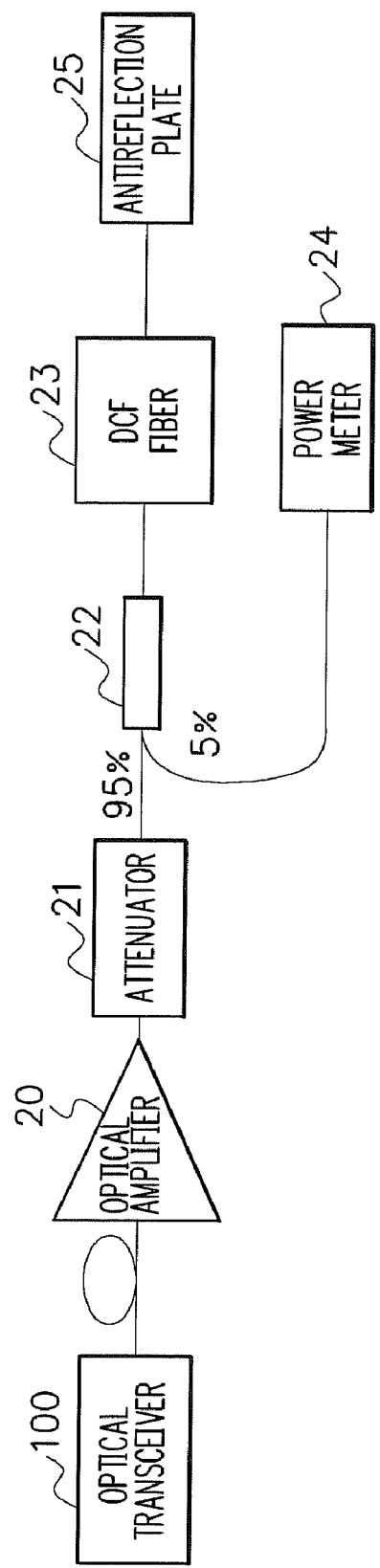
F I G. 3

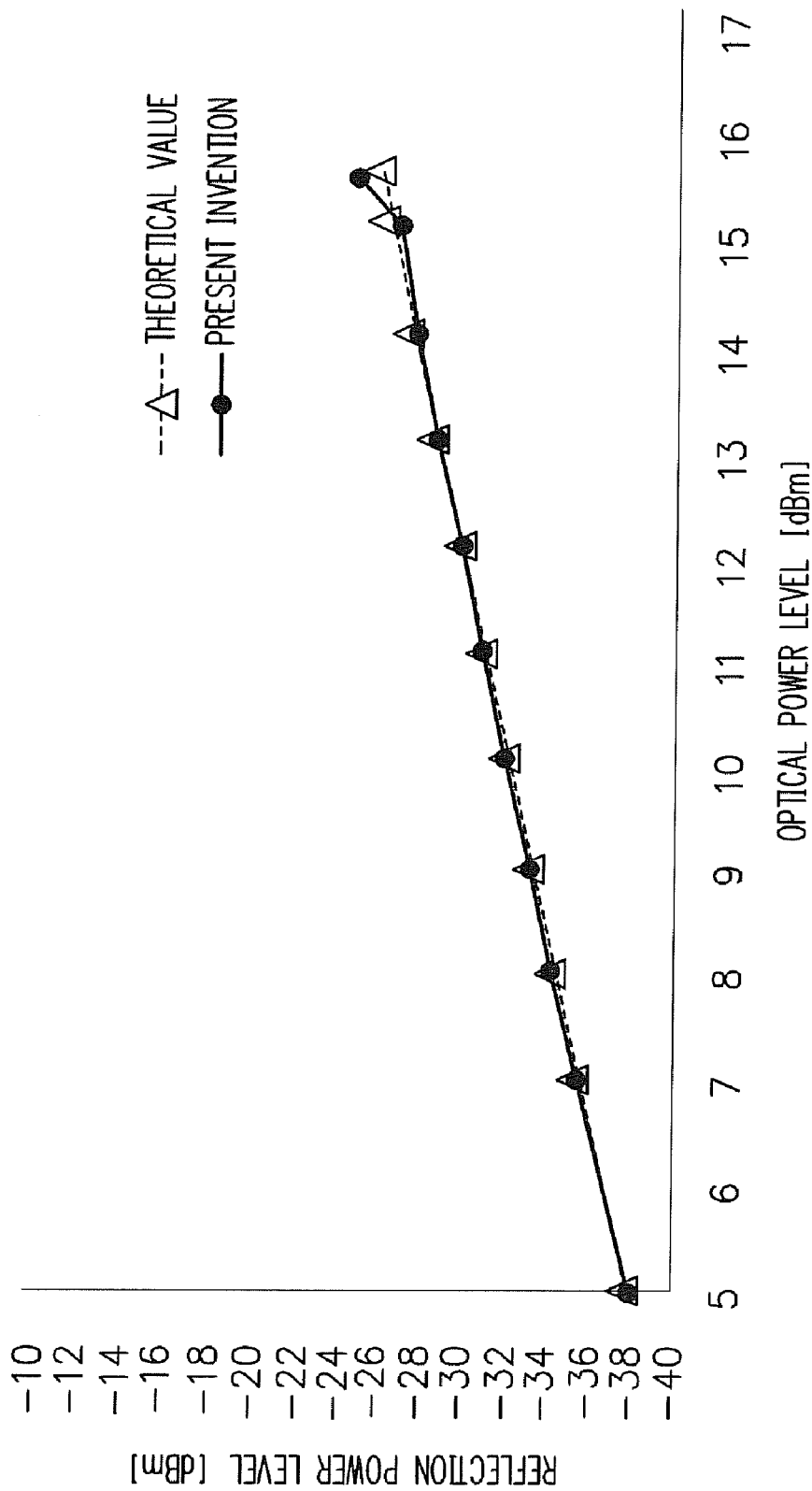

TRANSCEIVER FOR OPTICAL TRANSMISSION AND TRANSMISSION METHOD FOR THE SAME

This application is based upon and claims the benefit of priority from Japanese patent application No. 2007-075372, filed on Mar. 22, 2007, the disclosure of which is incorporated herein in its entirety by reference.

BACKGROUND OF THE INVENTION

1. Field of the Invention

The present invention relates to a transceiver for optical transmission and a transmission method for the same.

2. Description of the Prior Art

While standardization is being worldwide developed for specifications of products associated with transceivers for optical transmission, higher requirements are particularly proposed for downsizing of the products and lowering in the power source and consumption power. In addition, use of the single power source and removal of the negative power source are highly required due to requirement for general uses in the space or areas to install equipment or the customer environments. To cope with this present state, it is highly required to adopt a booster circuit, leading to a requirement for downsizing and power saving in the transceiver for optical transmission.

To cope with the difficulty, Japanese Patent Laid-Open Pub. No. 2005-80394 describes a power source including a booster circuit to boost a power source voltage to drive a liquid-crystal panel, the booster being also employed as a booster circuit of light-emitting elements. Japanese Patent Laid-Open Pub. No. Hei 4-188686 describes an optical transmitter unit including an intensity modulation section to modulate intensity of light from a light source on the basis of an input signal and a frequency modulation section to modulate a frequency for a power source at a modulation speed sufficiently lower than a modulation speed of the intensity modulation.

Also, according to Japanese Patent Laid-Open Pub. No. Hei 8-191271, there is proposed an optical transmitter including a carrier generator circuit for generating a carrier wave including a predetermined frequency, a mixing circuit for mixing a data signal with a carrier wave to generate a transmission signal, a boosting circuit driven by the carrier wave to produce a boost voltage higher than a power source voltage on the basis thereof, and a light emission section for emitting an optical signal including a quantity of light corresponding to the boost voltage. Additionally, Japanese Patent Laid-Open Pub. No. Hei 10-65627 describes, an optical transmitter unit including a first module for creating an optical signal including a bandwidth indicated by a main signal, a second module for receiving a control signal to expand the bandwidth by modulating the optical signal on the basis of the control signal, a third module operatively connected to an optical transmission line or path and the first module for supplying an optical signal to the optical transmission line and extracting feedback light including a Stimulated Brilluoin Scattering (SBS) light occurring in the optical transmission line, and a fourth module for receiving the feedback light to generate a control signal to set power of the stimulated Brilluoin scattering light to a fixed value.

However, the apparatuses described above are complex and cannot sufficiently suppress noise.

SUMMARY OF THE INVENTION

It is therefore an exemplary object of the present invention to provide a transceiver for optical transmission and a transmission method for the same in which noise can be sufficiently removed using a simple configuration to thereby remove the problem.

To achieve the object, the present invention has aspects as follows.

[Transceiver for Optical Transmission]

The transceiver for optical transmission in accordance with the present invention includes an optical transmitter module for superimposing low frequency obtained by boosting and filtering a power-source voltage onto an Laser Diode (LD) drive current.

[Transmission Method for Use with Transceiver for Optical Transmission]

The transmission method for use with transceiver for optical transmission in accordance with the present invention includes a step of superimposing low frequency obtained by boosting and filtering a power-source voltage onto an Laser Diode (LD) drive current.

BRIEF DESCRIPTION OF THE DRAWINGS

The objects and features of the present invention will become more apparent from the consideration of the following detailed description taken in conjunction with the accompanying drawings in which:

FIG. 1 is a conceptual diagram showing an exemplary embodiment of a transceiver for optical transmission in accordance with the present invention;

FIG. 3 is a conceptual diagram showing a measuring system of the transceiver for optical transmission shown in FIG. 1; and FIG. 4 is a graph showing an SBS suppression characteristic of the transceiver shown in FIG. 1.

DESCRIPTION OF THE EXEMPLARY EMBODIMENTS

Figure 2:
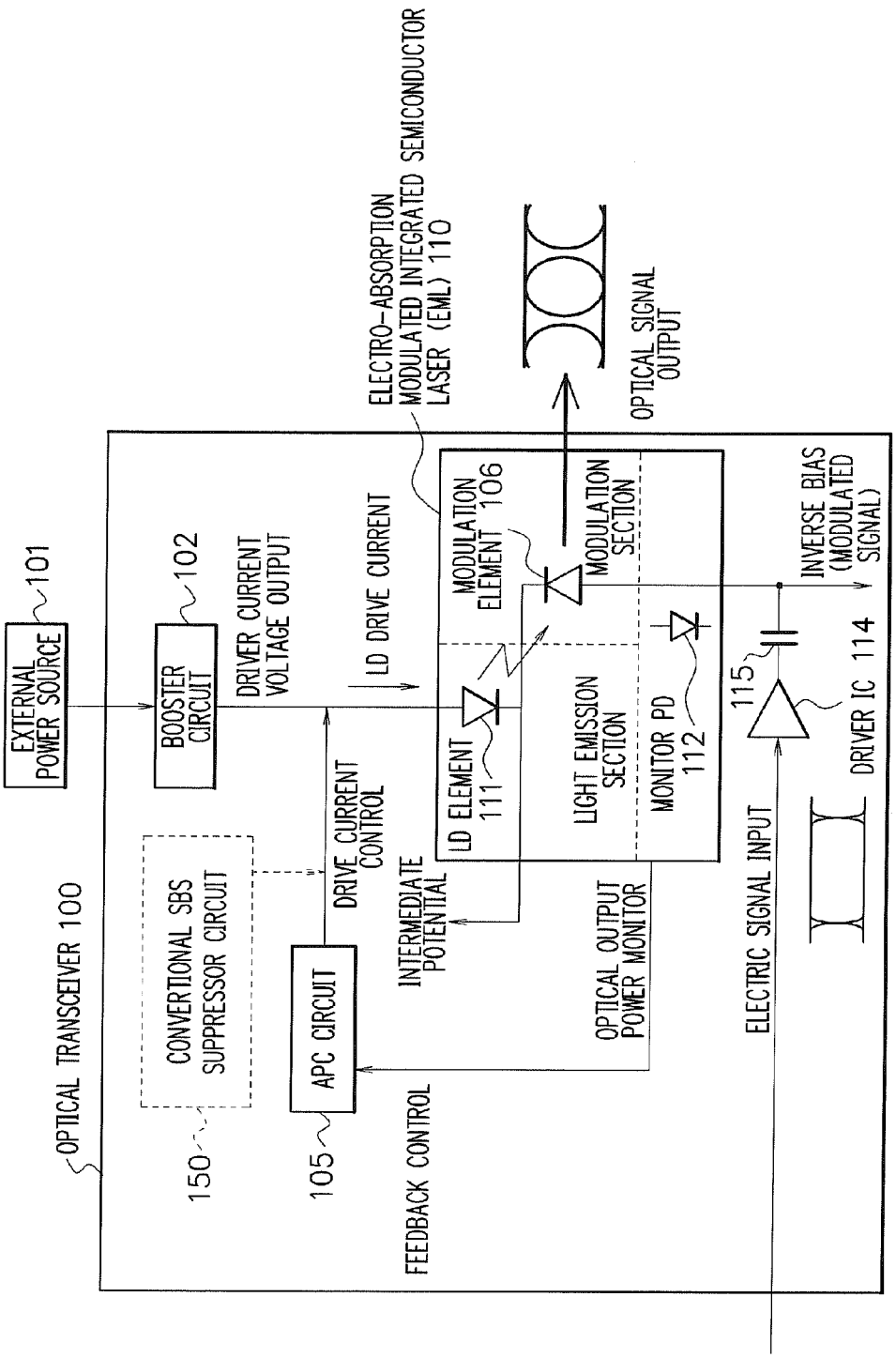
FIG. 2 is a diagram showing an example of an overall configuration of an optical transmitter module in a transceiver for optical transmission in accordance with the present invention.

[First Exemplary Embodiment]
[Configuration]

When the circuit scheme in accordance with the present invention is arranged in a transceiver for optical transmission (integrally including an external modulation semiconductor laser) employing an optical amplifier, the related SBS suppression circuit is not required and the SBS suppression characteristic is achieved by use of the internal power-supply circuit.

FIG. 1 schematically shows an exemplary embodiment of a transceiver for optical transmission in accordance with the present invention.

The optical transceiver 100 includes a booster circuit 102, which boosts a voltage from an external power source 101 to obtain a voltage necessary for an Laser Diode (LD) drive current.

As the booster circuit 102, there may be adopted a Direct Current (DC)-DC converter.

When the frequency component on the output side of the section including the booster 102 and the filter 104 is adjusted to an optimal value and a low frequency is superimposed onto the LD drive current, it is possible to provide an optical spectral width required for the SBS suppression.

The filter 104 may be, for example, a known low-pass filter including a register R and a capacitor C which are disposed in a crossed configuration or a known low-pass filter including a register R and a capacitor C which are connected in parallel between a noninverted input terminal and an output terminal of an operational amplifier.

In operation of FIG. 1, the system observes a monitor value of optical output power from an external modulation optical transmitter 106 such that an Automatic Power Controller (APC) circuit 105 conducts feedback control to set the value of the LD drive current to a fixed value.

In the general configuration, a circuit 150 including an oscillator and a filter is separately arranged as shown in FIG. 1 such that an output from the circuit 150 is employed to superimpose a low frequency onto the LD drive current. In contrast thereto, according to the present circuit configuration, the output from the integrally arranged power-source booster circuit including a filter is set to an optimal value through drive-current voltage control also in consideration of the SBS suppression. It is hence possible to carry out operation of a transceiver for optical transmission including the SBS suppression function without the circuit separately disposed as above.

FIG. 2 shows an example of overall structure of an optical transmitter module in a transceiver for optical transmission in accordance with the present invention.

The transceiver for optical transmission 100 includes a function to carry out signal processing, i.e., electro-optical and opto-electric conversions for optical communication. To implement the processing, the transceiver 100 includes semiconductor electric parts such as a microcomputer, a driver circuit, a power-source circuit, and a temperature regulating circuit as well as optical elements such as an optical transmitter and an optical receiver. Description will now be given of an exemplary embodiment according to the present invention. The exemplary embodiment is an application of the invention in which the optical transmitter 106 includes an Electro-absorption Modulated integrated semiconductor Laser (EML) 110. Description will be specifically given of driving of the EML 110 and a power-source configuration associated therewith.

The EML 110 is configured as an integrated circuit including a laser element 111 as a light emission section and the electro-absorption modulator element 106. In the light emission section, the laser 111 emits light when an LD drive current is applied thereto. In the modulator section, on the basis of a characteristic in which the optical absorptivity varies when a reverse bias is applied thereto, the EML 110 sets the optical output to on or off.

FIG. 2 also includes a feedback control circuit configuration in which a monitor photodiode 112 receives feedback or return light of the laser and converts the light into an electric signal as an optical output power monitor signal. The monitor signal is delivered to the APC circuit 105. That is, by observing the current optical output power and controlling the LD drive current, the APC circuit 105 keeps the optical output power fixed.

Power source required for the LD drive current is supplied from the output produced by the booster circuit 102. The booster 102 boosts a voltage from the external power source 101 through a switching operation with a fixed frequency and operation of its peripheral circuit.

The configuration also includes a coupling capacitor 115 and a drive Integrated Circuit (IC) 114.

In terms of signal processing, on the basis of an optical absorption characteristic of the modulation section, the system controls extinction ration of the laser beam from the light emission section by changing the reverse bias according to the input electric signal. As a result, the input signal is converted into an optical output signal from the EML 110.

In a first exemplary embodiment of the present invention, by use of the switching frequency of the booster 102 constructed as an LD drive power source in the transceiver 100, the frequency component remaining in the output voltage from the booster 102 is adjusted to an optimal value. Resultantly, the LD drive current under control of the APC 105 is modulated using a low frequency ranging from about several tens of kilohertz (kHz) to about one hundred hertz. The obtained LD drive current onto which the low frequency has been superimposed is then fed in the light emission section in a direction to a point of an intermediate voltage to cause laser oscillation. This makes it possible to expand the spectral width with the single longitudinal mode of the oscillation spectrum kept retained, leading to a satisfactory SBS suppression characteristic.

[Operation]

FIG. 2 shows an example of an overall configuration of an optical transmitter module in a transceiver for optical transmission in accordance with the present invention. In the configuration, a circuit 150 is additionally disposed in the circuit of the related technique. While the related circuit comprises mainly an oscillator and a filter, the additional circuit is not required in accordance with the present invention to additionally provide the SBS suppression characteristic using the booster 102 required in consideration of the specification of the transceiver 100 and the market environment as above.

FIG. 3 conceptually shows a measuring system of the transceiver shown in FIG. 1. FIG. 4 is a graph showing the SBS suppression characteristic of the transceiver of FIG. 1. In FIG. 4, the abscissa represents the optical power level and the ordinate indicates the reflection power level.

In FIG. 3, after the transceiver 100 sends an output signal via an optical fiber to an optical amplifier 20, the signal is fed to an attenuator 21, which reduces the signal to a value required for measurement and is then demultiplexed by an optical demultiplexer 22 into a portion of 95% and a portion of 5% of the original signal. The 95% portion is delivered to a Dispersion Compensating Fiber (DCF) 23 to be absorbed by an antireflection plat 25. The 5% portion is inputted to a power meter 24 for power measurement.

As a result of the measurement of the SBS suppression characteristic by the measuring system which conforms to the standards and which includes the transceiver for optical transmission configured in accordance with the present invention as shown in FIG. 3, there are attained measured values substantially matching theoretical values. As shown in FIG. 4, it is also confirmed that the standards are fully satisfied. Also, since the power source for the drive current is not obtained from the external source 101, but from the output signal produced by the booster 102, it is possible to optimize the consumption power. Additionally, since the intermediate potential is other than the ground level, the circuit configuration is effectively conforming to the International Electrotechnical Commission (IEC) standards such as standards for eye safety.

According to an aspect of the present invention, the exemplary embodiment of the transceiver includes an optical transmitter module in which the low frequency obtained by boosting and filtering a power-source voltage is superimposed onto the LD drive current.

Since the structure includes the optical transmitter module to superimpose the low frequency obtained by boosting and filtering a power-source voltage onto the LD drive current, the related SBS suppressing circuit can be dispensed with. It is possible to obtain the SBS suppression characteristic by use of an internal power-supply circuit. There is hence provided a transceiver for optical transmission in simple structure which is capable of sufficiently suppressing noise.

According to an aspect of another exemplary embodiment of a transceiver for optical transmission in accordance with the present invention, the optical transmitter module includes a booster to boost a power-supply voltage, a filter which receives the boosted voltage to pass through only a low frequency required to suppress noise, and an optical transmitter to superimpose the low frequency from the filter onto a drive current.

In the above construction, since the optical transmitter module includes a booster to boost a power-supply voltage, a filter to receive the boosted voltage and to pass through only a low frequency required to suppress noise, and an optical transmitter to superimpose the low frequency from the filter onto a drive current, the related SBS suppressing circuit is not required. The SBS suppression characteristic is achieved by use of an internal power-source circuit. This results in a transceiver for optical transmission in a simplified configuration capable of fully suppressing noise.

According to an aspect of still another exemplary embodiment of a transceiver for optical transmission in accordance with the present invention, there is included, in addition to the components described above, an APC circuit which performs feedback control of the drive current on the basis of an optical output power monitor signal from the optical transmitter.

In the above structure, since the transceiver includes the APC circuit to perform feedback control of the drive current using an optical output power monitor signal from the optical transmitter, it is possible to obtain an advantage of a stable output signal in addition to the noise reduction advantage.

According to an aspect of further another exemplary embodiment of a transceiver for optical transmission in accordance with the present invention, the optical transmitter includes, in addition to the constituent elements above, a laser diode element, an electro-absorption modulator element connected to the laser diode element, a monitor photodiode to monitor return light of the laser diode element, and a driver section to change a reverse bias of the electro-absorption modulator element.

According to the construction, since the optical transmitter includes a laser diode element, an electro-absorption modulator element connected to the laser diode element, a monitor photodiode to monitor return light of the laser diode element, and a driver section to change a reverse bias of the modulator element, it is possible to obtain an advantage of a stable output signal in addition to the noise reduction advantage.

In still another exemplary embodiment of a transceiver for optical transmission in accordance with the present invention, there exists, in addition to the above configuration, an aspect wherein the connection point between the laser diode element and the electro-absorption modulator element is at a potential of the ground level and the reverse bias is a negative power source.

According to the structure, since the connection point between the laser diode element and the electro-absorption modulator element has a potential of the ground level and the reverse bias is a negative power source, there is attained, in addition to the advantage of the noise reduction, an advantage that the transceiver effectively conforms to the IEC standards.

According to further another exemplary embodiment of a transceiver for optical transmission in accordance with the present invention, there exists, in addition to the above configuration, an aspect that the low frequency is in a range from about several tens of kilohertz to about one hundred kilohertz.

In an exemplary embodiment of a transmission method for use with a transceiver for optical transmission in accordance with the present invention, a low frequency attained by boosting and filtering a power-source voltage is superimposed onto the LD drive current.

According to the configuration including an optical transmitter to superimpose the low frequency obtained by boosting and filtering a power-source voltage onto the LD drive current, the related SBS suppressing circuit is not required. The SBS suppression characteristic is obtainable by use of an internal power-source circuit. This results in a transceiver for optical transmission in a simplified configuration capable of fully suppressing noise.

Another exemplary embodiment of a transmission method for use with a transceiver for optical transmission in accordance with the present invention includes the steps of boosting a power-supply voltage, receiving the boosted voltage and passing only a low frequency required to suppress noise, and superimposing the low frequency from the filter onto a drive current.

Due to the structure, since the method includes boosting a power-supply voltage, receiving the boosted voltage and passing only a low frequency required to suppress noise, and superimposing the low frequency onto a drive current, the related SBS suppressing circuit can be dispensed with. The SBS suppression characteristic is achieved by an internal power-source circuit. Resultantly, there is provided a transceiver for optical transmission in a simple construction to sufficiently suppress noise.

In still another exemplary embodiment of a transmission method for use with a transceiver for optical transmission in accordance with the present invention, there is included, in addition to the configuration above, the step of performing monitor feedback of a drive current based on an optical output power monitor signal from the optical transmitter.

In the configuration, the feedback control is carried out for the drive current on the basis of the optical output power monitor signal from the optical transmitter. For this purpose, there is disposed an APC circuit to carry out the feedback control. It is therefore possible to obtain an advantage of a stable output signal in addition to the noise reduction advantage.

In another exemplary embodiment of a transmission method for use with a transceiver for optical transmission in accordance with the present invention, there is included, in addition to the structure above, the step of changing a reverse bias of an electro-absorption modulator element connected to a laser diode element.

According to the structure, by changing the reverse bias of an electro-absorption modulator element coupled with a laser diode element, it is possible to obtain an advantage of a stable output in addition to the advantage of noise reduction.

In still another exemplary embodiment of a transmission method for use with a transceiver for optical transmission in accordance with the present invention, there exists, in addition to the configuration, an aspect wherein the connection point between the laser diode element and the electro-absorption modulator element is at a potential of the ground level and the reverse bias is a negative power source.

According to the construction, since the connection point between the laser diode element and the electro-absorption modulator element has a potential of the ground level and the reverse bias is a negative power source, the present configuration leads to, in addition to the advantage of the noise reduction, an advantage of conformity to the IEC standards.

[Advantages]

The first advantage resides in that the SBS suppression characteristic of the transceiver for optical transmission is obtained without employing the excessive circuit required in the related art. This reduces the number of parts and extends the field of general uses of the transceiver. Since one of oscillators necessary in the related art can be dispensed, which improves the noise characteristic, for example, reduction in power noise and Electromagnetic Interference (EMI) noise. This advantageously contributes to improvement of the characteristics of the transceiver in the downsizing trend. Specifically, the oscillator to be removed is a low-frequency oscillator employed in the related SBS suppressing circuit. This is effective for the standardization and the cost reduction of constituent components of the transceiver including a multiplicity of high-frequency parts.

The second advantage is that in a transceiver for optical transmission requiring the SBS suppression characteristic, the power source for the LD drive current is supplied from the output signal produced by a booster circuit, not from an external power supply. Therefore, the consumption power is optimized to resultantly save power. By using the present configuration in EML, the intermediate potential is other than the ground level. That is, the circuit construction is effective with respect to the IEC standards, for example, standards for eye safety.

The third advantage is associated with the severe requests from the users for the transceiver for optical transmission, specifically, standardization, downsizing, and lowering in the power source and the consumption power, as the functions are improved and the operation speed is increased in the transceiver. In the market environments, it is a natural trend of the circuit configuration to adopt the boosting circuit in the transceiver. In this situation, there is provided an advantage that the SBS suppression characteristic required for transceivers for long-distance transmission can be implemented through the LD drive by use of the booster circuit.

In the description of the exemplary embodiments, the power supply of EML has an intermediate potential other than the ground level and the reverse bias is a positive power source. However, the present invention is not restricted by the exemplary embodiments. Also in a situation wherein the EML power source has an intermediate potential at the ground level and the reverse bias is a negative power source, the low frequency required for the SBS suppression can be superimposed onto the LD drive current by use of the booster circuit.

An exemplary advantage according to the present invention is that since there is disposed an optical transmitter module for superimposing low frequency obtained by boosting and filtering a power-source voltage onto an LD drive current, the related SBS light suppressing circuit is not required. Hence, the SBS suppressing characteristic is obtained by use of an internal power supply circuit. Resultantly, the transceiver for optical transmission can fully suppress noise using a simply configuration.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined claims.

What is claimed is:

1. A transceiver for optical transmission in which a power-source voltage is boosted and is then filtered to obtain a low frequency, the transceiver comprising an optical transmitter module for superimposing the low frequency onto an Laser Diode (LD) drive current,
wherein the low frequency is in a range from several tens of kilohertz to about one hundred kilohertz,
wherein the low frequency is obtained using a switching frequency of a booster circuit that boosts the power-source voltage,
and wherein a connecting point between a laser diode element and an electro-absorption modulator element is other than a ground level, and a reverse bias is a positive power source.

2. The transceiver for optical transmission in accordance with claim 1, comprising:
a booster circuit for boosting a power-source voltage;
a filter for passing a low frequency which is included in the voltage boosted by the booster circuit and which is required to suppress noise; and
an optical transmitter for superimposing the low frequency onto a drive current.

3. The transceiver for optical transmission in accordance with claim 2, comprising an Automatic Power Control (APC) circuit for conducting feedback control for the drive current on the basis of an optical output power monitor signal of the optical transmitter.

4. The transceiver for optical transmission in accordance with claim 2, wherein the optical transmitter comprises:
the laser diode element;
the electro-absorption modulator element, which is connected to the laser diode element;
a monitor photodiode for monitoring return light of the laser diode element; and
a driver module for changing the reverse bias of the electro-absorption modulator element.

5. A transmission method for use with a transceiver for optical transmission, comprising:
boosting a power-source voltage using a booster circuit;
filtering the power-source voltage to obtain a low frequency; and,
superimposing the low frequency onto an Laser Diode (LD) drive current,
wherein the low frequency is in a range from several tens of kilohertz to about one hundred kilohertz,
wherein the low frequency is obtained using a switching frequency of the booster circuit,
and wherein a connecting point between a laser diode element and an electro-absorption modulator element is other than a ground level, and a reverse bias is a positive power source.

6. The transmission method for use with a transceiver for optical transmission in accordance with claim 5, further comprising:
passing a low frequency which is included in the voltage boosted by the booster circuit and which is required to suppress noise.

7. The transmission method for use with a transceiver for optical transmission in accordance with claim 6, further comprising conducting feedback control for the drive current on the basis of an optical output power monitor signal of the optical transmitter.

8. The transmission method for use with a transceiver for optical transmission in accordance with claim 6, further comprising changing the reverse bias of the electro-absorption modulator element connected to the laser diode element.

* * * * *